United States Patent [19]

Fraze

[11] Patent Number: 4,669,217
[45] Date of Patent: Jun. 2, 1987

[54] PLANT PROPAGATION SYSTEM AND APPARATUS

[75] Inventor: Raymond E. Fraze, San Ramon, Calif.

[73] Assignee: Aeroponics, Associates-1983 Ltd., Hayward, Calif.

[21] Appl. No.: 699,842

[22] Filed: Feb. 8, 1985

Related U.S. Application Data

[63] Continuation-in-part of Ser. No. 552,688, Nov. 17, 1984.

[51] Int. Cl.$^4$ ............................................... A01G 31/00
[52] U.S. Cl. ............................................ 47/64; 47/59
[58] Field of Search ................... 47/17, 64, 60, 61, 62, 47/63, 59, 56; 137/209; 261/DIG. 7

[56] References Cited

U.S. PATENT DOCUMENTS

| | | | |
|---|---|---|---|
| 3,456,386 | 7/1969 | Holden | 47/56 |
| 3,877,172 | 4/1975 | Schwab et al. | 47/64 |
| 3,877,358 | 4/1975 | Karr | 261/DIG. 7 |
| 3,929,397 | 12/1975 | Aronson | 137/209 |
| 4,211,034 | 7/1980 | Piesner | 47/59 |
| 4,255,896 | 3/1981 | Carl | 47/82 |

Primary Examiner—Robert A. Hafer
Assistant Examiner—Bradley M. Lewis
Attorney, Agent, or Firm—George W. Wasson

[57] ABSTRACT

A modular plant propagation system and apparatus utilizes a first or lower reservoir containing a liquid plant nutrient in fluid communication with a second or upper reservoir in which a plant propagation support module utilizes a sterile, low water retention, linear foam plastic providing fluid communication between the exterior and interior of the second or upper reservoir. The nutrient fluid in the first nutrient reservoir is forced up into the second reservoir by compressed gas for predetermined cycles and periods of time to provide nutrients to the roots of the plants supported by the linear foam plant propagation support module. A computer is used to control air and root temperatures, humidity, nutrient quality, nutrient cycling rate and level in the first and second reservoirs and utilizes an image recognition apparatus to measure plant growth rate and produce maturity or ripeness to achieve optimum or maximum growth rate potential for the plant being propagated.

A self-containing nutrient plant propagation module utilizes a sterile, low water retention, linear foam plastic in which generally parallel, elongated interconnecting cellular channels provide fluid communication from the top of the module to the bottom of the module in which is uniformly disbursed a comminuted, water soluble, time release plant nutrient.

6 Claims, 13 Drawing Figures

PLANT PROPAGATION SYSTEM AND APPARATUS

This application is a continuation-in-part of application Ser. No. 06/552,688 filed Nov. 17, 1984.

BACKGROUND OF THE PRIOR ART

This invention relates generally to plant propagation devices and in particular to hydroponic and aeroponic plant propagation devices and to seed germination and plant propagation support media including self-contained nutrient plant support media incorporating a plant nutrient.

The hydroponic and aeroponic plant growing apparatus of the prior art is varied and quite extensive.

Some prior art apparatus utilizes horizontally disposed tubular containers through which a nutrient fluid is adapted to flow about plant containing cups which are installed in holes in the walls of the tubular containers.

The tubular containers are mounted parallel to each other in either a vertical or horizontal array and are serially connected by conduits. The nutrient fluid is pumped serially through the horizontally arrayed containers or allowed to flow by gravity through the vertically arrayed containers, serially from top to bottom.

The various prior art seed germination and plant propagation support devices or media generally utilize an organic media such as peat moss incorporating a binder and a fertilizer or an inorganic media such as sand, gravel or a comminuted plastic material or inert mineral material.

Some plant support media utilize randomly interconnecting cellular plastic material incorporating a comminuted plant nutrient disbursed throughout the media.

Much of the prior art hydroponic and aeroponic apparatus failed to provide for greater control over the amount of time the plant roots were exposed to the liquid nutrient and the amount of time the plant roots were exposed to air, a gas or mixture of gases.

In addition, the prior art hydroponic and aeroponic apparatus failed to provide for testing of the nutrient fluid for harmful anaerobic bacteria or other harmful organisms until the plant was too seriously infected to apply corrective action.

Also, the prior art hydroponic and aeroponic apparatus of the prior art failed to allow for sterilization of the apparatus and system without having to destroy or remove the plants being propogated.

In most cases, where sand, gravel or the like were used as the plant support or propagation media, corrective action required sterilization of the entire media from the outset. With sand, gravel or other mineral material, sterilization was a tedious and expensive procedure.

Where the plant support media utilizes a randomly interconnected cellular plastic material, although the material was initially sterile, its water retention characteristics were relatively high such that some of the nutrient fluid would remain in the same cells for long periods of time. If unwanted anaerobic bacteria were inadvertently introduced into the nutrient, the stagnant material in the cells would become a breeding ground for the bacteria or other harmful organisms which could not be completely flushed out all of the cells of the randomly interconnecting cellular plant support media.

Thus, the sterilization of the apparatus of the prior art and the nutrient solution could not be corrected except by tedious and expensive flushing or removal of all of the infected plant support media.

Furthermore, the prior art hydroponic and aeroponic apparatus were all concerned only with the plant nutrient and plant support aspects of plant growth and were not concerned with total plant environment and control for maximum growth potential of the particular plant being propogated.

SUMMARY OF THE INVENTION

The plant propagation system and apparatus of the present invention comprises, basically, a first nutrient reservoir disposed below a second nutrient reservoir, means for fluidly communicating the first reservoir with the second reservoir, a plant propagation module in fluid communication with the second reservoir, the module comprising a generally low water retention, porous material having a plurality of elongated, interconnecting cellular channels providing fluid communication between the exterior of the second reservoir and means for periodically transferring liquid nutrient from the first to the second reservoir and back again to the first reservoir.

The plant propagation system and apparatus further comprises a computer, a nutrient testing means having its output data communicated to the computer, means for measuring temperature and humidity both inside and outside the greenhouse also connected to the computer, means for measuring and controlling nutrient temperature connected to the computer, means for heating and cooling greenhouse air and controlling humidity connected to the computer, means for measuring plant growth connected to the computer and means for controlling the total plant environment to achieve maximum or optimum plant growth potential.

The plant growing module comprises, basically, a generally rigid, water impervious housing having a pair of openings at opposite ends thereof, a chemically neutral, generally water insoluble, plant support media disposed within the housing comprising a generally low water retention, porous material having a plurality of elongated, interconnecting cellular channels providing fluid communication between the pair of openings at opposite ends of the housing and containing a seed proximate the middle of the module.

The self-contained nutrient plant growing module comprises, basically, a chemically neutral, generally water insoluble, plant support media comprising a generally low water retention, porous material having a plurality of elongated, generally parallel, interconnecting cellular channels providing fluid communication generally linearly from top to bottom of the media and containing a water soluble, time release, comminuted plant nutrient homgeneously distributed throughout the porous material and containing a seed proximate the middle thereof.

It is, therefore, an object of the present invention to provide a plant propagation system and apparatus.

It is a further object of the present invention to provide a plant propagation system and apparatus that is computer controlled to achieve optimum or maximum plant growth potential.

It is still a further object of the present invention to provide a plant propagation system and apparatus in which the parameters of plant growth rate and maturity, nutrient temperature, plant exposure to nutrient time, air temperature, air humidity and nutrient quality are controlled by a computer to achieve optimum or maximum plant growth potential.

It is yet a further object of the present invention to measure plant growth rate and produce maturity utilizing computer image recognition techniques.

It is another object of the present invention to provide a plant propagation system and apparatus utilizing a two-reservoir nutrient system in which nutrient is periodically transported from a first reservoir to a second reservoir containing the roots of the plant being propagated and back to the first reservoir whereby the plant roots are cyclically exposed to the nutrient solution and to a gas or gases in a generally closed or sealed system free of anaerobic bacteria or other harmful organisms.

It is still another object of the present invention to provide a plant propagation system and apparatus that can be completely flushed of nutrient and anaerobic or other harmful bacteria or organisms without the removal of the plant propagation support media or the plants being propagated.

It is yet another object of the present invention to provide a sterile seed germination media.

It is another object of the present invention to provide a plant propagation support module utilizing a linear foam plastic having elongated, generally parallel interconnecting cellular channels.

It is yet another object of the present invention to provide a self-contained nutrient plant propagation module utilizing a linear foam plastic in which is dispersed a comminuted, water-soluble, time release nutrient.

These and other objects of the present invention will become manifest upon study of the following detailed description when taken together with the drawings.

DESCRIPTION OF THE PREFERRED EMBODIMENT

Figure 1:
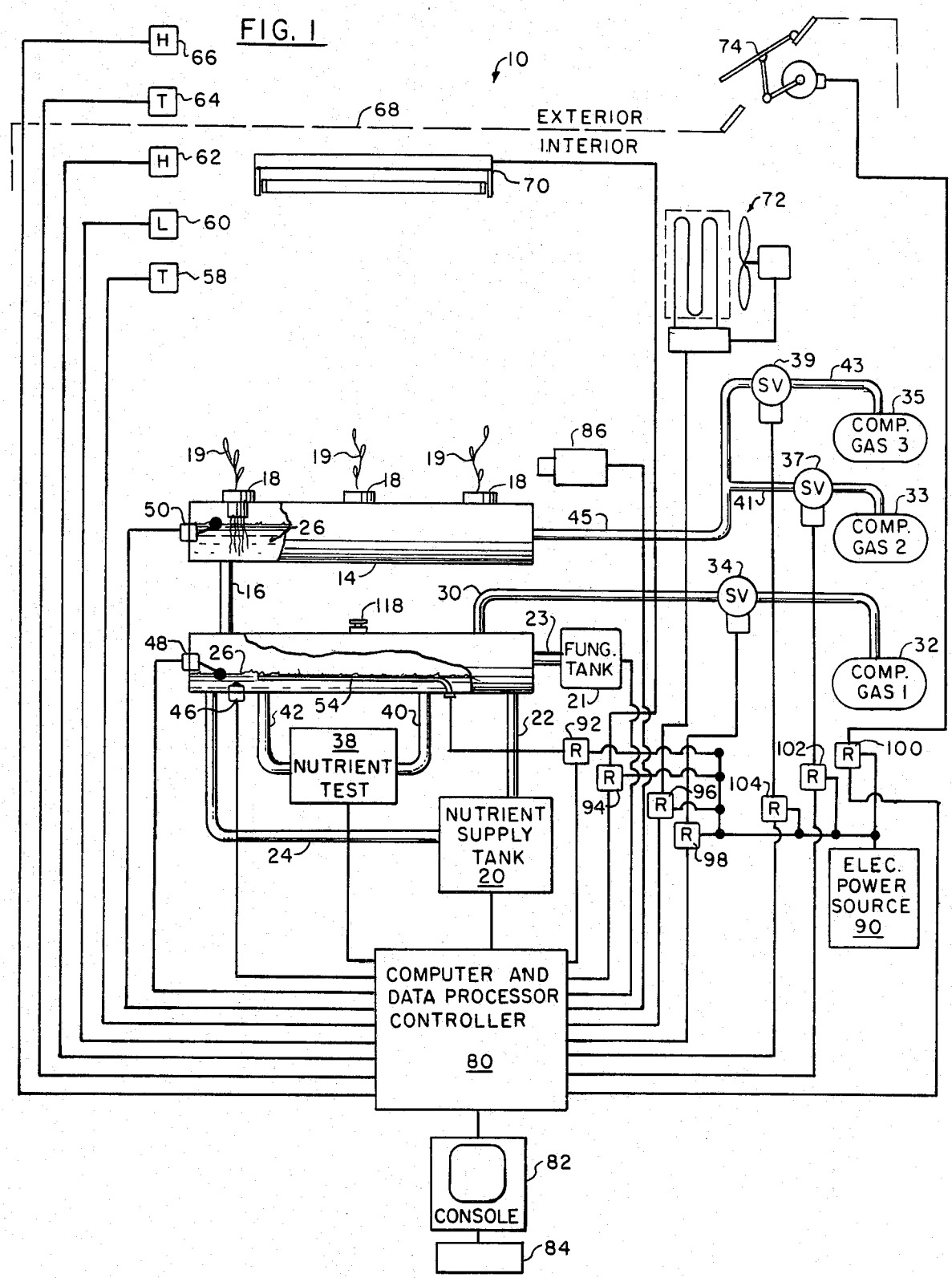
FIG. 1 is a schematic diagram of the overall plant propagation system and apparatus of the present invention.

With reference to FIG. 1, there is illustrated a schematic diagram of the overall plant propagation system and apparatus 10 of the present invention comprising, basically, a first or lower nutrient reservoir 12 and a second or upper nutrient reservoir 14 in fluid communication with first reservoir 12 by means of conduit 16.

Several plant propagation modules 18 containing plants 19 are adapted to be in fluid communication with the interior of second nutrient reservoir 14.

A nutrient supply tank 20 is in fluid communication with first reservoir 12 through conduits 22 and 24 to provide nutrient solution 26 in first nutrient reservoir 12 for pumping up to second nutrient nutrient reservoir 14.

Two conduits are used so that as old nutrient is being removed from one end of first nutrient reservoir 12, fresh nutrient is pumped into the other end of first nutrient reservoir 12 to avoid creating a pressure difference within reservoir 12 which would allow outside air to enter the reservoir housing.

If a liquid fungicide is to be used, a fungicide pump and supply tank 21 is arranged to be in fluid communication with lower reservoir 12 through conduit 23. Fungicide pump and supply tank 21 is also electrically connected to computer and data processor controller 80 in order to control the flow of fungicide into nutrient reservoir 12 to prevent the growth of harmful organisms on the roots of the plants 19 contained in upper reservoir 14.

A conduit 30 connects first nutrient reservoir 12 with compressed gas tank 32. The flow of compressed gas from tank 32 is controlled by solenoid valve 34.

A nutrient testing means 38 is also connected in fluid communication with first nutrient reservoir 12 by means of conduits 40 and 42.

A nutrient temperature transducer 46 is located in first reservoir 12 to measure nutrient temperature.

A first nutrient reservoir level transducer indicator 48 is also mounted in first reservoir 12 to measure the level of nutrient therein.

A second nutrient level transducer indicator 50 is mounted in second nutrient reservoir 14 to measure the nutrient level in that reservoir.

A nutrient heating element 54 is also mounted inside first nutrient reservoir 12 to maintain the nutrient 26 at a constant temperature or at various predetermined temperatures during the growing cycle as determined by the plant growth and maturation characteristics.

An air temperature transducer 58, a light level transducer 60 and a humidity detector transducer 62 are all located within the greenhouse or the area proximate plant propagation modules 18 in second reservoir 14.

An additional air temperature transducer 64 and humidity transducer 66 are located outside the green house as indicated by dashed line 68 schematically marking the extent of the the greenhouse shelter or closed environment for plant propagation modules 18 in order to compare exterior to interior growing parameters.

A light source 70 is also mounted within the greenhouse proximate plant propagation modules 18.

An air heating device 72 is also mounted within the green house in order to maintain air temperature at a predetermined level or levels.

A motor driven vent mounted in the greenhouse roof is used to vary the atmospheric conditions within the greenhouse depending upon exterior and interior temperature and humidity differentials.

A computer and data processor controller 80, utilizing a cathode ray screen (CRT) console 82 and keyboard 84, is used to measure and control the parameters affecting growing conditions.

Plant growth rate and produce maturation rate are measured by an image transducer 86 which converts the plant image to digital data for measuring differential plant growth and maturation rate is also connected to computer and data processor controller 80 through relays 102 and 104, respectively.

In addition, interior temperature transducer 58, interior light level transducer 60, interior humidity transducer 62, exterior temperature transducer 64, exterior humidity transducer 66, first nutrient level transducer 48, second nutrient level transducer 50, nutrient temperature transducer 46, nutrient test device 38 and nutrient supply tank 20 are all connected to computer and data processor controller 80.

Further, light source 70, air heater 72, motor operated vent 74, nutrient heater 54 and solenoid valve compressed gas control 34 are all connected to electric power source 90. They are, however, also controlled by computer and data processor controller 80 through various relays. In particular, nutrient heater 54 is controlled by relay 92, light source 70 is controlled by relay 94, air heater 72 is controlled by relay 96, solenoid valve 34 is controlled by relay 98, and air vent 74 is controlled by relay 100.

A pair of compressed gas tanks 33 and 35, respectively, are arranged to be fluidly connected to solenoid valves 37 and 39, respectively, through conduits 41 and 43. Both solenoid valves 37 and 39 are fluidly connected to upper reservoir 14 through conduit 45.

Solenoid valves 37 and 39 are also electrically connected to computer and data processor controller 80.

By filling compressed gas tank 33 with, for example, carbon dioxide gas, and tank 35 with, for example, oxygen gas, the ratio of the gas mixture to the plant root system in upper reservoir 14 can be readily controlled.

Nitrogen gas could also be substituted for either oxygen or carbon dioxide gases or a third or fourth compressed gas tank and solenoid valve flow control could be added.

Also, a gaseous fungicide could be substituted for any of the above named gases in order to control any plant root diseases.

Thus it can be seen that by controlling the cyclic rate of nutrient feeding of the plants growing in modules 18, as well as controlling the parameters of differential plant growth rate, air temperature, light level, air humidity, nutrient temperature and nutrient quality, gas exposure to the root system, optimum or maximum plant growth rate and produce maturation potential can be achieve.

Figure 2:
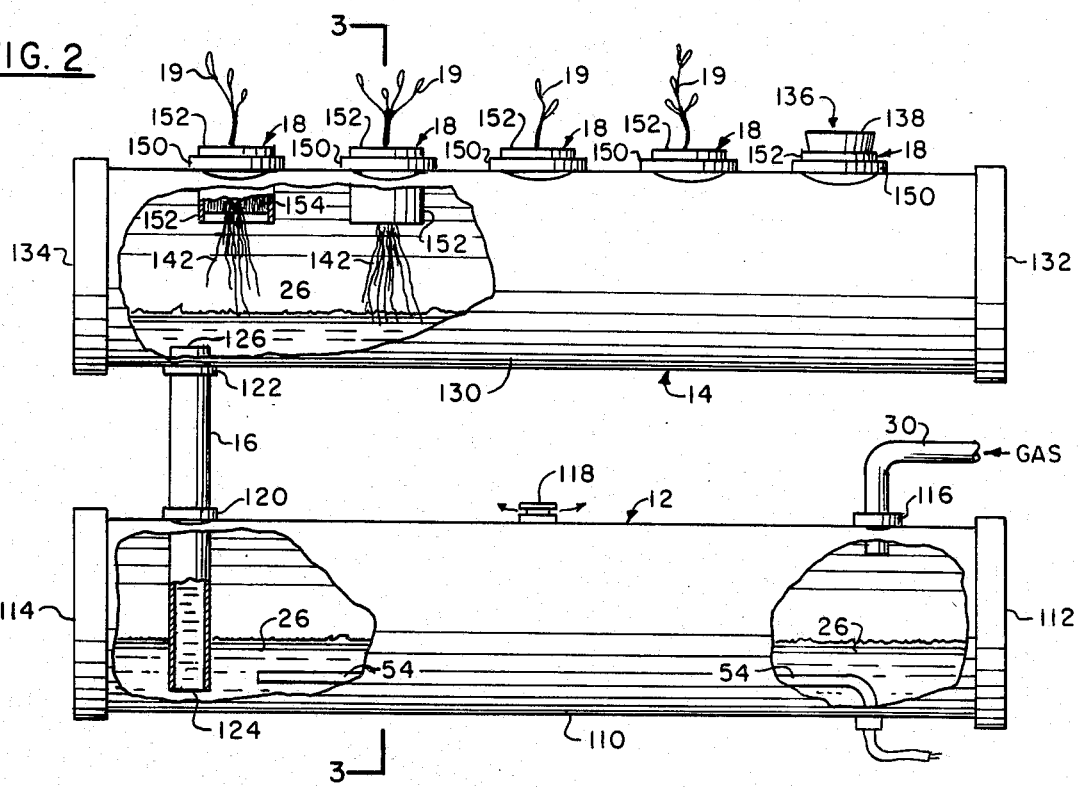
FIG. 2 is an elevational, partial cut-away side view of the two-reservoir plant propagation apparatus of the present invention.

With respect to FIG. 2, there is illustrated a more detailed elevational, partial cut-away view of the two-reservoir plant propagation apparatus shown in FIG. 1.

First nutrient reservoir 12 comprises, basically, a cylindrical pipe or housing 110 having end caps 112 and 114 to hermetically seal the pipe.

Pipe 110 can comprise a polyvinylchloride or other non-phytotoxic plastic of sufficient size to store the necessary volume of nutrient desired for periodically nurturing the plants in second nutrient reservoir 14.

Conduit 30, in fluid communication with compressed gas tank 32, is also in fluid communication with first nutrient reservoir 12 and is connected to pipe or housing 110 by an airtight seal fitting 116.

A controlled orifice bleed valve 118 is also mounted in pipe or housing 110 to provide a controlled bleeding of gas out of pipe or housing 110. Bleed valve 118 can also be provided with a one-way valve to permit gas to escape from pipe or housing 110 and prevent air or gases outside housing 110 from entering housing 110 and maintain its closed or sealed condition.

Conduit, 16 which fluidly communicates first nutrient reservoir 12 with second nutrient reservoir 14, is hermetically sealed to pipe or housing 110 of first nutrient reservoir 12 by seal member 120 and to pipe or housing 130 of second reservoir 14 by seal member 122.

It will be noted that the bottom end 124 of conduit 16 is located proximate the bottom of pipe or housing 110 while the top end 126 of conduit 16 is located proximate the bottom portion of pipe or housing 130 of reservoir 14.

Second or upper reservoir 14 comprises a generally cylindrical pipe or housing 130 fitted with end caps 132 and 134 to hermetically seal the pipe ends.

A number of plant propagation modules 18 are mounted in the top surface of pipe or housing 130 of upper or second nutrient reservoir 14 with a blank module 136 provided with a cap 138 which can be removed for inspection of the interior of pipe or housing 130 and be used as an opening for providing replacement nutrient if nutrient supply tank 120 is not used.

Figure 3:
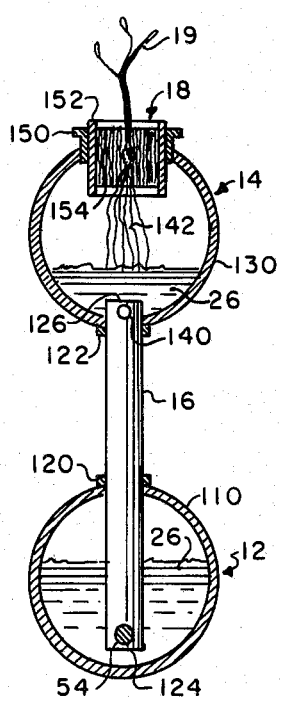
FIG. 3 is an elevational, cross-sectional view of the two-reservoir plant propagation apparatus of FIG. 2 taken at lines 3—3.

With reference to FIG. 3, there is illustrated a cross-sectional, elevational view of the first and second nutrient reservoir configuration of FIG. 2 taken at lines 3—3.

With specific reference to conduit 16, it will be noted that a hole 140 tangent the inside surface of housing 130 is provided proximate top end 126 of conduit 16 in order to provide a drain for all of the nutrient from upper nutrient reservoir 14 down to lower nutrient reservoir 12.

To operate the apparatus shown in FIGS. 2 and 3, with compressed gas solenoid valve 34 closed, gas bleed vent 118 is first adjusted to provide a very slow leakage of gas and out of housing 110 to allow any fluids in second nutrient reservoir 14 to flow down into first nutrient reservoir 12. During this condition, all of the roots 142 of plants 19 growing in plant modules 18 will be exposed to gases such as carbon dioxide, nitrogen or oxygen or a mixture of these or other gases. Upon command by computer and data processor controller 80, solenoid valve 34 is caused to open when it is energized by activation of relay 98.

Upon activation, solenoid valve 34 will allow compressed gas to pass from compressed gas tank 32, through conduit 30 into first nutrient reservoir 12 thus causing pressure to be applied to the surface or nutrient 26.

Pressure thus applied will force nutrient 26 into opening 124 of conduit 16 the bottom end thereof, up through conduit 16 and out through top opening 26 and opening 140 to flood into pipe or housing 130 of second or upper nutrient reservoir 14.

The level of nutrient 26 in upper nutrient reservoir 14 will thus rise and flood roots 142 providing nutrients and water to the plants 19 supported in plant propagation support modules 18.

At a predetermined time, computer and data processor controller 80 will deenergize relay 98 closing solenoid valve 34 to stop the flow of compressed gas through conduit 30 into first nutrient reservoir 12.

When the flow of gas is stopped, the flow of gas being bled from lower nutrient reservoir 12 by bleed valve 118 at a lower rate than the incoming gas from compressed gas source 32 will continue because of the hydraulic head of the nutrient solution in upper or second nutrient reservoir 12. Thus, the nutrient solution in upper reservoir 14 will slowly flow back down into first nutrient reservoir 12 through conduit 16 depending upon the rate of gas flowing out of bleed valve 118.

By using bleed valve 118, it can be seen that no outside air will ever enter first or lower nutrient reservoir 12 since gas will at all times be escaping from bleed valve 118 when nutrient is being forced up to second nutrient reservoir 14 by compressed gas or flowing back down by gravity to first nutrient reservoir 12.

In addition, by controlling the flow of gases into upper reservoir 14 from tank 33 or 35, a minimum amount of outside air will enter upper reservoir 14 through cellular channels 158 in plant propagation module 18. In other words, just enough outside air will enter cellular channels 158 to flush out any nutrient solution but not enough air will be permitted to enter upper reservoir 14 because of the injection of gases from tanks 33 and 35 to replace the volume of fluid flowing back down to lower reservoir 12.

Thus, roots 142 in upper reservoir 14 will periodically be fed nutrient to sustain their growth and be exposed to oxygen to reduce the danger of anaerobic bacteria from growing and causing damage to the plants.

Figure 4:
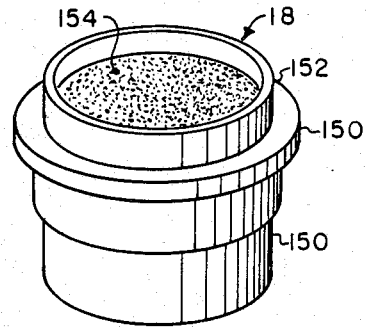
FIG. 4 is an isometric view of a typical plant propagation module with installation collar used in the two-reservoir plant propagation apparatus of FIGS. 2 and 3.

With reference to FIG. 4, there is illustrated a typical plant propagation module 18 whose outer housing 152 is frictionally engaged with a collar or sealing ring 150.

Collar or sealing ring 150 is adapted to be attached and hermetically sealed to a hole in upper housing 130 with outer housing 152 of the plant propagation module 18 frictionally engaging the inner surface of sealing ring 150 so that it can be removed and replaced readily once the plant has finished its growing cycle.

Figure 5:
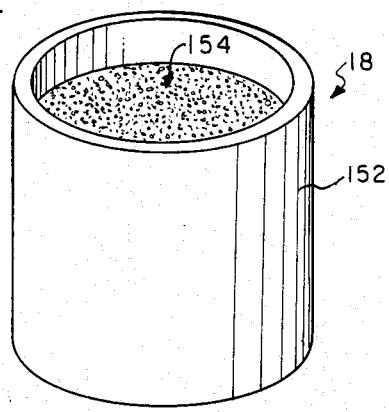
FIG. 5 is an isometric view of a typical plant propagation module of the present invention.

With reference to FIG. 5, there is illustrated a more detailed view of the plant propagation support module 18 shown in FIG. 4.

The plant propagation support module 18 comprises, basically, an outer housing 152 comprising a generally cylindrical water impervious, rigid plastic pipe open at both ends and containing a generally low water retention, porous foam plastic material 54.

Porous plastic foam material 54 (154) (180) (202) comprises a two-part isocyanate foam, well known in the art, which, when the two parts, resin and oxidizer, are combined, generates carbon dioxide gas which "blows" or creates the cellular structure while the mixture is still fluid and concurrently causes the resin to polymerize and produce a generally self-supporting mass having an open or interconnecting cellular structure.

The elongated cellular structure is achieved by causing the foam, during its fluid phase prior to full polymerization, to flow unidirectionally. That is, in one method, the fluid foam is placed at the bottom of a narrow tube and allowed to expand or "blow" upwardly in the tube. The cellular structure will then be elongated in the direction of flow of the fluid foam as it expands in the tube.

In another method, the two-part isocyanate materials are mixed together in a container and, while still in the fluid phase, mechanically squeezed in a lateral direction forcing the fluid to flow or be extruded in one longitudinal direction thus elongating the cellular structure in the direction of fluid flow.

This mechanical process can include a mold having movable walls whereby the walls are moved to compress the foam plastic while in the fluid phase to force the material to flow unidirectionally along a longitudinal axis thus elongating the cellular structure parallel to the unidirectional axis.

This mechanical process can also include a mold having an entry port and an elongated necked down portion. The foam plastic is poured into the entry port where it expands and is forced into the elongated necked down portion while still in the fluid phase where the cells are caused to elongate along the longitudinal axis of the elongated necked down portion.

These various mechanical processes tend to further cause the walls of the cellular structure to rupture and thus increase the number of interconnections between cells.

By aligning the elongation of the cells vertically, it can be seen that any fluids container in the cells will tend to drain downwardly and thus result in a low water retention foam plastic material.

It must be pointed out that the elongated, interconnecting cellular foam plastic material of the present invention is fabricated using carbon dioxide to expand or "blow" the material. This is to be contrasted with other gases such as Freon which are used to "blow" or expand polyurethane foam.

In some instances, a small amount of water can be added to the mixture to produce steam during the foaming process to further expand the material.

Applicant has found that an organically neutral or "non-toxic" gas such as carbon dioxide does not cause any growth retardation for sensitive clonal tissue when compared with polyurethane foams using Freon and other gases to create the cellular structure.

In most cases, when foamed, the cellular material is sterile, however, since the isocyanate foam material has a relatively high softening and melting point, final sterilizing can be accomplished by autoclaving using superheated steam at a temperature below the softening point of the material.

Figure 6:
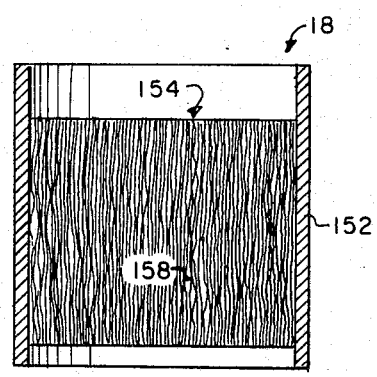
FIG. 6 is a cross-sectional, elevational view of the typical plant propagation module of the present invention showing the cellular channel arrangement of the low water retention, porous plant propagation material of the present invention.

With reference to FIG. 6 there is illustrated a cross-sectional, elevational view of the plant propagation support module 18 of FIG. 5 showing the generally low water retention porous foam plastic material 154 which further comprises a plurality of elongated, interconnecting cellular channels 158 providing fluid communication between the open ends of tubular housing 152.

Figure 7:
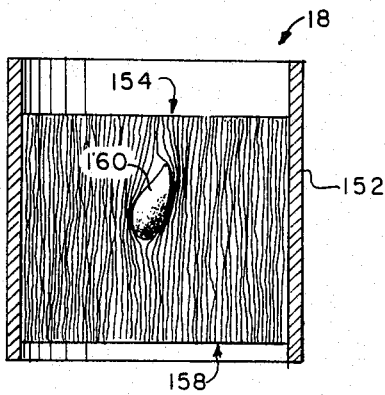
FIG. 7 is a cross-sectional, elevational view of the typical plant propagation module of the present invention shown with a typical ungerminated seed contained therein.

With reference to FIG. 7, the plant propagation support module 18 of FIGS. 5 and 6 is shown containing an ungerminated seed 160 which has been forced down into porous foam plastic material 154. It can be seen that the resilience of porous foam plastic material 154 must be sufficient to hold seed 160 in place and, at the same time, close off the entry point of the seed by expanding back into the hole to prevent any exposure of seed 160 to the outside air or excess moisture.

Figure 8:
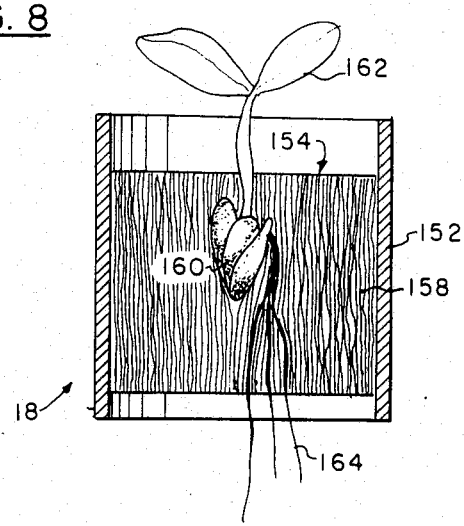
FIG. 8 is a cross-sectional, elevational view of the typical plant propagation module of the present invention shown with a newly germinated seed contained therein.

With reference to FIG. 8, there is further illustrated the plant propagation support module 18 of FIGS. 5, 6 and 7 showing seed 160 now germinated into a plant having a stalk 162 and a root structure 164.

It will be noted that the root structure 164 will generally follow the line of least resistance to the nutrient solution generally following cellular channels 158.

It will also be noted that as seed 160 expands, the resiliency and crushability of porous foam plastic material 154 is such as to permit expansion of the plant without cracking or fissuring of the block of material 154.

Figure 9:
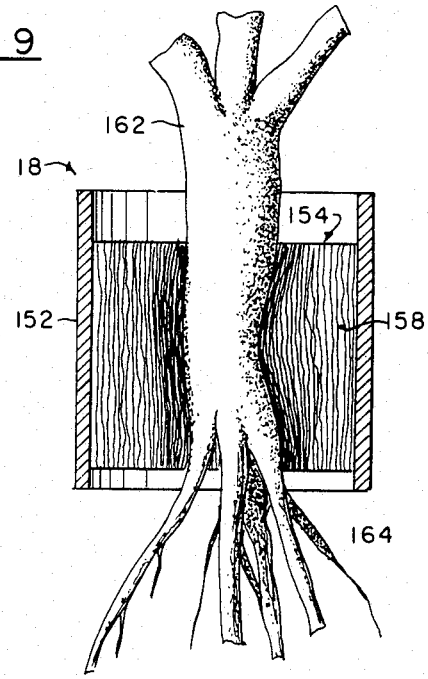
FIG. 9 is a cross-sectional, elevational view of the typical plant propagation module of the present invention shown containing a mature plant stalk and root system.

With reference to FIG. 9, there is illustrated a further progression of the growth of plant stalk 162 in the plant propagation support module 18 shown in FIGS. 5, 6, 7 and 8 illustrating the compression and crushing of the cellular structure adjacent stalk 162 to provide plant support while the cellular structure at the outer edges near housing 152 remains somewhat intact.

Figure 10:
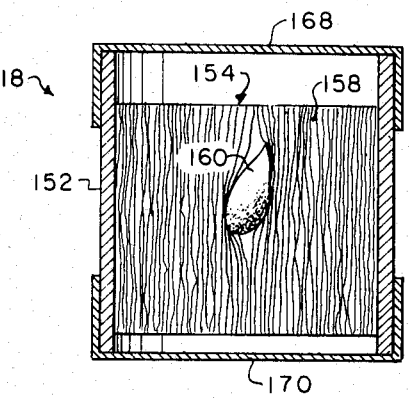
FIG. 10 is a cross-sectional, elevational view of the typical plant propagation module of the present invention showing the method of hermetically sealing the module for shipping and storing.

With reference to FIG. 10, there is illustrated a further embodiment of the plant propagation support module 18 of FIGS. 5, 6, 7, 8 and 9 further comprising a shrink wrap plastic or upper or top cap 168 and a similar bottom cap 170 to hermetically seal seed 160 in porous foam plastic material 154 to maintain the sterility of plant propagation support module 18 and to prevent moisture from entering and causing seed 160 to prematurely germinate.

It can also be seen that by utilizing the apparatus of FIGS. 2 and 3 and the cellular structure of porous material 154, the fluid rises in upper reservoir 14, and by capillary action ascends into channels 158 of the cellular structure, nutrients can be provided to the seed as well as to the roots of the growing plant.

Then, as the fluid flows back down into lower or first nutrient reservoir 12, air will be drawn into the cells or channels 158 from outside of upper nutrient reservoir 14 pulling any water entrained in the cells and held there by capillary action, back into the interior of upper reservoir 14. Thus a very small amount of nutrient solution will remain in the cellular structure in plant propagation support module 18 to minimize the growth of any harmful organisms.

Should the nutrient become contaminated, a sterile solution can be placed on the top surface of porous material 54 and be drawn into cellular channels 158 to thus flush out any contaminated nutrient without having to remove or destroy any of the plants being supported by plant propagation support module 18 shown.

In the alternative, a fungicide can be injected into the nutrient from fungicide pump and supply tank 21 in the event the nutrient become contaminated with an organism such as, for example, that which would cause "damping off" or other common plant disease. Such contamination would be detected by nutrient test device 38.

Figure 11:
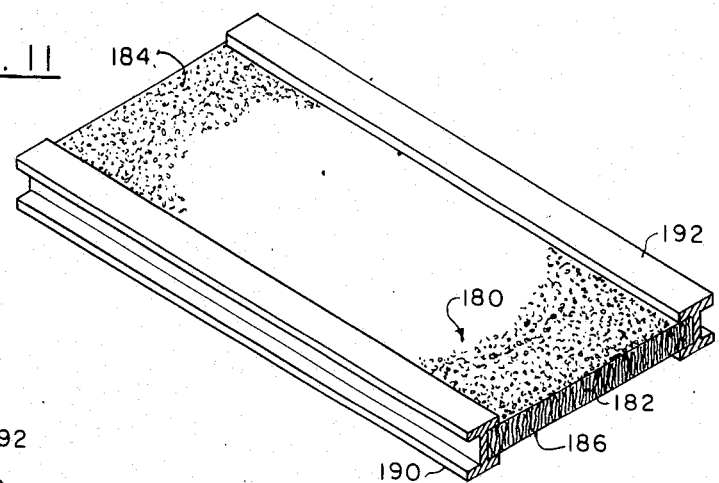
FIG. 11 is an isometric view of a further embodiment of the plant propagation module of the present invention utilizing a flat slab of linear foam plastic as the plant support media.

With reference to FIG. 11, there is illustrated a further embodiment of the plant propagation support module of the present invention comprising a generally rectangular sheet 180 of a generally low water retention porous plastic material having a plurality of elongated, interconnected cellular channels 182 providing fluid communication between the upper surface 184 and bottom surface 186 thereof.

A pair of I-beam reinforcing members 190 and 192 are disposed along the parallel longitudinal edges of porous rectangular sheet 180 with the edges of sheet 180 abutting the web of I-beams 190 and 192, respectively, and enclosed, respectively, between the top and bottom flanges of the I-beams.

Figure 12:
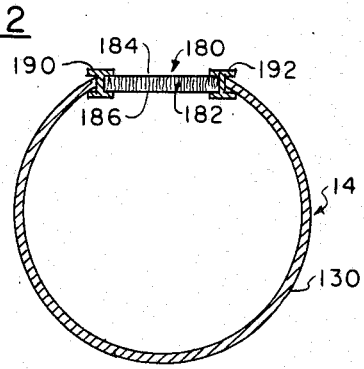
FIG. 12 is a cross-sectional, elevational view showing the method of installing the plant propagation module shown in FIG. 11 in the upper plant nutrient reservoir housing.

With reference to FIG. 12, there is illustrated the method of installing plant propagation module 180 mounted in housing 130 of upper nutrient reservoir 14.

It can be seen that a slot is cut longitudinally in pipe or housing 130 with the cut edges being adapted to abut the flanges of I-beams 190 and 192, respectively, and be frictionally engaged between the flanges of those two I-beams.

The use of the plant propagation support module shown in FIGS. 11 and 12 permits more rapid and easier removal replacement of the support module from upper or second nutrient reservoir 14 by merely sliding the module along the cut edges of pipe or housing 130 and replacing it with a new module.

To operate the apparatus shown in FIGS. 1 through 12, inclusive, computer and data processor controller 80 is initially programed to the growth parameters of the particular plants being propagated in plant module 18. These parameters would typically include the following:

1. Plant maturation period.
2. Optimum air temperature range during maturation period.
3. Optimum root temperature range during maturation period.
4. Variation of root temperature range during maturation period.
5. Optimum humidity level and range.
6. Variation of humidity level during maturation period.
7. Optimum root-nutrient exposure time.
8. Variation of root-nutrient exposure time during maturation period.
9. Ratio of plant exposure to light and dark.
10. Variation of ratio of plant exposure to light and dark during maturation period.
11. Ratio of nutrient to gas exposure time of roots during maturation period.

With the above parameters established, the system is now ready to start up for continuous operation.

During continuous operation, inside and outside temperature and humidity are continuously monitored. As the temperature and humidity vary from optimum, corrective measures are made as directed by computer and data processor controller 80.

In addition, nutrient temperature is also monitored and controlled by computer and data processor controller 80 should it vary from the parameters set.

As an additional control, image transducer 86 constantly monitors plant growth rate to determine whether the growth rate meets or exceeds that for which the maturation period parameter has been set.

If growth rate is to low, nutrient rate and other parameters are adjusted to assure optimum or maximum growth rate potential.

In the event nutrient test device 38 detects unwanted particles, organisms or nutrient concentration in nutrient solution 26, computer and data processor controller 80 will take immediate corrective action by either filtering the nutrient, adding fungicide or bactericide, or changing nutrient concentration, or other action necessary to correct the problem and return the plant to its normal growth characteristics.

Figure 13:
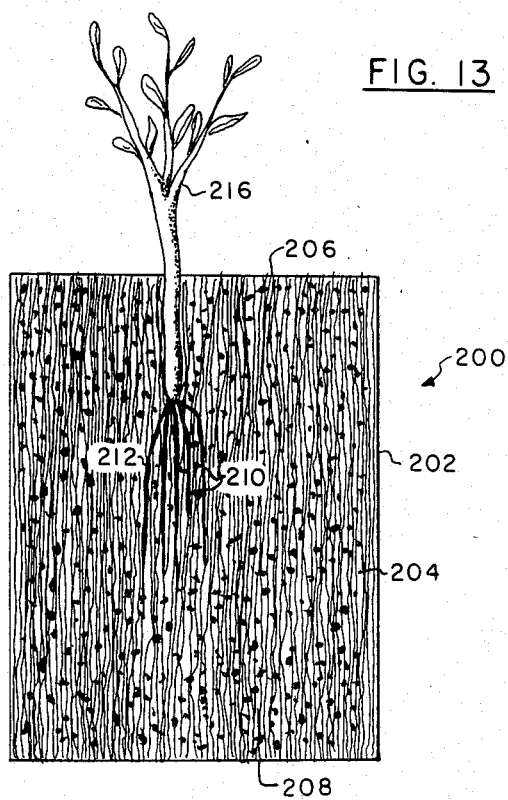
FIG. 13 is a cross-sectional, elevational view of the self-contained nutrient plant propagation module of the present invention.

With reference to FIG. 13, there is illustrated a self-contained nutrient plant propagation module 200 which comprises, basically, a block 202 of a generally low water retention, porous foam plastic material having a plurality of elongated, interconnected cellular channels 204 providing fluid communication between the top 206 of module 200 and bottom 208 of module 200.

A comminuted plant nutrient 210 is uniformly distributed throughout the porous foam plastic material 202 to provide nutrients to roots 212 of plant 216.

It can be seen that as water is applied to top surface 206 of porous foam plastic block 202, it will flow down into elongated cellular channels 204 by gravity and capillary action, there to dissolve some of the time release nutrient particles 210 and to continue to pass down to bottom 208 of block 202.

As roots 212 grow, they will tend to follow the line of least resistance to the nearest nutrient particles 210 and then continue down elongated interconnecting cellular channels 204 in order to reach further nutrient dissolved in the water poured along top surface 206.

Thus it can be seen that self-contained nutrient plant propagation module 200, if placed on a surface which will hold water, will support plant 216 without the addition of further plant nutrients.

In the alternative, self-contained nutrient plant propagation module 200 can be placed on the ground or slightly imbedded in the ground to first allow germination and sufficient growth to give plant 216 strength from nutrient 210 contained with self-contained nutrient plant propagation module 200 and then permit the roots 212 to continue to grow in the earth to gain further nutrients and grow to maturity.

As a further alternative, self-contained nutrient plant propagation module 200 can be placed in outer housing 150, to substitute for plant propagation module 18, and then be inserted in the hole in upper reservoir housing 130.

Instead of a nutrient fluid 26 being held in first reservoir 12 and second or upper reservoir 14, sterilized water can be used or water in which a fungicide or bactericide has been added.

The fluid is then raised up to second reservoir 14, as previously described, to a level sufficient to enter cellular channels 204 on module 200 in order to dissolve some of comminuted nutrient 210.

The fluid is then lowered to first reservoir 12 to thus achieve an aeration of the root system in upper reservoir 14 as well as provide nutrient to the root system from the dissolved nutrients obtained from comminuted nutrient particles 210.

I claim:

1. An apparatus for propagating plants comprising
    a first plant nutrient reservoir, said first plant nutrient reservoir being sealed so as to contain liquid nutrient within said first reservoir and to permit said liquid nutrient to be moved from said first reservoir upon the establishment of increased gas pressure within said first reservoir,
    a second plant nutrient reservoir disposed at an elevation above said first nutrient reservoir,
        said second plant nutrient reservoir being so constructed as to retain plant nutrients within said second reservoir when said plant nutrients are forced into said second reservoir upon the establishment of increased pressure within said first reservoir and to permit said plant nutrients to drain from said second reservoir under the force of gravity when said established increased pressure is removed,
    at least one plant propagation module in liquid communication with said second nutrient reservoir, said plant propagation module comprising
    means defining a generally rigid, water impervious housing having means defining a pair of openings disposed at opposite ends thereof, one of said pair of openings being outside said second plant nutrient reservoir and the other of said pair of openings being within said second plant nutrient reservoir,
    a removable chemically neutral, generally water insoluable, plant support media disposed within said housing, said media comprising
    a generally low water retention porous foam plastic material having a plurality of elongated, interconnecting cellular channels providing liquid communication between said pair of openings at opposite ends of said housing,
    and means for periodically transferring said liquid nutrient from said first nutrient reservoir to said second nutrient reservoir and from said second nutrient reservoir to said first nutrient reservoir to periodically place said liquid nutrient adjacent to said opening in said housing within said second reservoir, said means comprising
    a compressed gas supply,
    means for fluidly communicating said compressed gas supply with said first nutrient reservoir,
    a conduit interconnecting said first and second plant nutrient reservoirs having one end disposed proximate the bottom of said first nutrient reservoir and another end disposed within said second plant nutrient reservoir in a position to permit movement of said liquid nutrient from said first reservoir and draining of said liquid nutrient from said second reservoir whereby said compressed gas supplied in said first reservoir causes liquid nutrient to flow from said first nutrient reservoir to said second nutrient reservoir through said conduit until the level of liquid nutrient in said first nutrient reservoir reaches the level of the end of said conduit disposed proximate the bottom of said first nutrient reservoir,
    and said first nutrient reservoir including a bleed valve fluidly communicating the interior of said first nutrient reservoir with the exterior of said first nutrient reservoir, said bleed valve having a gas flow rate less than the rate of flow of compressed gas flowing into said first nutrient reservoir from said compressed gas supply.

2. The plant propagation device as claimed in claim 1 wherein said plant support media comprises
    a generally low water retention, porous foam plastic material having a plurality of generally parallel, elongated, interconnecting cellular channels providing fluid communication between said pair of openings disposed at opposite ends of said housing.

3. The plant propagation device as claimed in claim 1 wherein said plant support media comprises
    a generally low water retention, porous foam plastic material having an interconnecting cellular structure of parallel disposed, elongated cellular channels providing fluid communication between said pair of openings disposed at opposite ends of said housing.

4. The plant propagation device as claimed in claim 1 wherein said plant support media comprises a generally low water retention, interconnecting cellular material having an elongated, parallel cellular wall structure providing fluid communication between said pair of openings disposed at opposite ends of said housing.

5. The plant propagation device as claimed in claim 1 wherein said plant support media comprises a crushable, generally low water retention material adapted to permit a plant to increase in diameter as it grows within said media sending its stalk out of one of said openings in said housing and its roots out of the other of said openings in said housing, said cellular material having an elongated, generally parallel cellular wall structure providing fluid communication between said opening disposed at opposite ends of said housing.

6. An apparatus for propagating plants comprising (a) a first plant nutrient reservoir, (b) a second plant nutrient reservoir disposed at an elevation above said first plant nutrient reservoir, (c) a conduit interconnecting said first and second plant nutrient reservoirs, (d) said first plant nutrient reservoir being sealed so as to contain liquid nutrient within said first plant nutrient reservoir and to permit said liquid nutrient to be moved from said first plant nutrient reservoir upon the establishment of increased gas pressure within said first plant nutrient reservoir, (e) said second plant nutrient reservoir being so constructed as to retain plant nutrients within said second plant nutrient reservoir when said plant nutrients are forced into said second plant nutrient reservoir upon the establishment of increased gas pressure within said first plant nutrient reservoir and to permit said plant nutrients to drain from said second plant nutrient reservoir under the force of gravity when said established increased gas pressure is removed, (f) said conduit having one end disposed proximate the bottom of said first plant nutrient reservoir and another end disposed within said second plant nutrient reservoir in a position to permit movement of said liquid nutrient from said first plant nutrient reservoir and draining of said liquid nutrient from said second plant nutrient reservoir whereby said established increased gas pressure within said first plant nutrient reservoir causes liquid nutrient to flow from said first plant nutrient reservoir to said second plant nutrient reservoir through said conduit until the level of liquid nutrient in said first plant nutrient reservoir reaches the level of the end of said conduit disposed proximate the bottom of said first plant nutrient reservoir, (g) at least one plant propagation module in liquid communication with the interior of said second plant nutrient reservoir, said plant propagation module comprising means defining a generally rigid, water impervious housing having means defining a pair of openings disposed at opposite ends thereof, one of said pair of openings being outside said second plant nutrient reservoir and the other of said pair of openings being within said second plant nutrient reservoir, (h) a removable, chemically neutral, generally water insoluable, plant support media disposed within said housing, said media comprising a generally low water retention porous foam plastic material having a plurality of elongated, interconnecting cellular channels providing liquid communication between said pair of openings at opposite ends of said housing, (i) and means for periodically transferring said liquid nutrient from said first plant nutrient reservoir to said second plant nutrient reservoir and from said second plant nutrient reservoir to said first plant nutrient reservoir to periodically place said liquid nutrient adjacent to said opening in said housing within said second plant nutrient reservoir, said means comprising a compressed gas supply and means for fluidly communicating said compressed gas supply with said first plant nutrient reservoir at a controllable gas pressure and gas flow rate, (j) and said first plant nutrient reservoir including a bleed valve fluidly communicating the interior of said first plant nutrient reservoir with the exterior of said first plant nutrient reservoir, said bleed valve having a gas flow rate less than said gas flow rate of flow of compressed gas flowing into said first plant nutrient reservoir from said compressed gas supply.

* * * * *